United States Patent [19]

Sharma et al.

[11] Patent Number: 5,599,764
[45] Date of Patent: Feb. 4, 1997

[54] SIZE SELECTIVE HYDROPHOBIC ADSORBENT FOR ORGANIC MOLECULES

[75] Inventors: Pramod K. Sharma, La Canada; Gregory S. Hickey, Altadena, both of Calif.

[73] Assignee: California Institute of Technology, Pasadena, Calif.

[21] Appl. No.: 235,351

[22] Filed: Apr. 29, 1994

[51] Int. Cl.⁶ .................................................. B01J 20/10
[52] U.S. Cl. ........................ 502/417; 502/407; 502/413; 502/420; 502/423
[58] Field of Search ................................. 502/407, 413, 502/417, 420, 423

[56] References Cited

U.S. PATENT DOCUMENTS 4,058,483  11/1977  Henbest .................................. 252/446

OTHER PUBLICATIONS

P. K. Sharma, et al., "Copper oxide modified carbon molecular sieves for selective oxygen removal," *Gas Separ & Purif.* 4:203–207 (1990).

G. S. Hickey, et al., "Selective molecular sorption by high surface area catalyst supports," *Thermochim. Acta* 226:333–342 (1993).

H. C. Foley, "Carbon Molecular Sieves: Properties and Applications in Perspective," *ACS Symposium Series* 368:335–360 (1988).

H. Juntgen, "New Applications for Carbonaceous Adsorbents," *Carbon* 15:273–283 (1977).

Union Carbide technical leaflet S–115 "Molecular Sieves; molecular sieve catalyst data".

Foley "Carbon Molecular Sieves: Properties and Applications in Perspective", *ACS Symposium Series* 368: 335–360 (1988).

*Primary Examiner*—Asok Pal
*Assistant Examiner*—Timothy H. Meeks
*Attorney, Agent, or Firm*—Limbach & Limbach

[57] ABSTRACT

The present invention relates to an adsorbent formed by the pyrolysis of a hydrophobic silica with a pore size greater than 5 Å, such as SILICALITE™, with a molecular sieving polymer precursor such as polyfurfuryl alcohol, polyacrylonitrile, polyvinylidene chloride, phenol-formaldehyde resin, polyvinylidene difluoride and mixtures thereof. Polyfurfuryl alcohol is the most preferred. The adsorbent produced by the pyrolysis has a silicon to carbon mole ratio of between about 10:1 and 1:3, and preferably about 2:1 to 1:2, most preferably 1:1. The pyrolysis is performed as a ramped temperature program between about 100° and 800° C., and preferably between about 100° and 600° C.

The present invention also relates to a method for selectively adsorbing organic molecules having a molecular size (mean molecular diameter) of between about 3 and 6 Å comprising contacting a vapor containing the small organic molecules to be adsorbed with the adsorbent composition of the present invention.

28 Claims, 3 Drawing Sheets

SIZE SELECTIVE HYDROPHOBIC ADSORBENT FOR ORGANIC MOLECULES

ORIGIN OF INVENTION

The invention described herein was made in the performance of work under NASA contract NAS 7-1260, and is subject to the provisions of Public Law 96-517 (35 USC 202) in which the Contractor has elected to retain title.

TECHNICAL FIELD

The present invention generally relates to a composition which can effectively adsorb small organic molecules with a molecular size as small as 3 Å, which composition exhibits good stability over a wide temperature range and remains active in high moisture environments.

BACKGROUND ART

Many scientific instruments and their components, such as optical surfaces to detectors used in space research and exploration, are prone to contamination from organic molecules. Over a period of time, contaminant build up can adversely affect the performance of such instruments. Of particular concern are cryogenically cooled image processing optics and sensors because contaminant adsorption in these devices causes a reduction in the quality of the information transmitted from space.

Small organic contaminants, (molecules with a molecular size of about 6 Å or less) such as straight chain hydrocarbons, benzene, and their simple derivatives, are particularly difficult to remove from gas samples. Such hydrocarbon contaminants may come from paints, plastics, adhesives, motor or magnet windings, and like sources. Other sources may include combustion and biodegradation products, wastewater and environmental remediation processes.

Previously, control of organic contaminants has involved the use of adsorbents such as aluminosilicates which have a pore size on the order of 10 Å, such as Linde zeolite 13X and LZY52, and hydrophobic silica such as SILICALITE™, a commercially available molecular sieving material with an average pore size greater than 5 Å. However, 13X and LZY52 aluminosilicates are not effective adsorbents for smaller organics. Smaller pore size aluminosilicates, such as zeolite 4A are not hydrophobic. Further, aluminosilicates tend to adsorb large quantities of water vapor, lessening the capacity of the adsorbent for trapping the organics.

Hydrophobic silica, such as SILICALITE™ which has a pore size greater than 5 Å, although highly hydrophobic, does not effectively adsorb small organic molecules (i.e., molecules with a molecular size between 3 and 5 Å). Rather, SILICALITE™ preferentially adsorbs molecules with a molecular size of about 5–6 Å. This can be explained by the observation that adsorbents tend to adsorb molecules with a molecular size near that of the adsorbent pore size most strongly. Thus, the composite adsorbent possesses the adsorptive size selectivity from 3–6 Å.

STATEMENT OF THE INVENTION

The present invention relates to an adsorbent formed by the pyrolysis of a hydrophobic silica with a pore size greater than 5 Å, such as SILICALITE™, with a molecular sieving polymer precursor such as polyfurfuryl alcohol, polyacrylonitrile, polyvinylidene chloride, phenol-formaldehyde resin, polyvinylidene difluoride and mixtures thereof. Polyfurfuryl alcohol is the most preferred. The adsorbent produced by the pyrolysis has a silicon to carbon mole ratio of between about 10:1 and 1:3, and preferably about 2:1 to 1:2, most preferably 1:1. The pyrolysis is performed as a ramped temperature program between about 100 and 800° C., and preferably between about 100 and 600° C.

The present invention also relates to a method for selectively adsorbing organic molecules having a molecular size (mean molecular diameter) of between about 3 and 6 Å comprising contacting a vapor containing the small organic molecules to be adsorbed with the adsorbent composition of the present invention.

OBJECTS OF THE INVENTION

It is an object of the invention to identify a substantially hydrophobic adsorbent material for small organic molecules with a molecular size as small as 3.0 Å.

It is a further object of the invention to identify a method by which the adsorbent can be readily prepared.

It is yet another object of the invention to identify a method for using the adsorbent for efficiently and selectively adsorbing small organic molecules, without undue interference from water.

BRIEF DESCRIPTION OF THE DRAWINGS

The invention will be better understood by reference to the appended Figures, of which.

DETAILED DESCRIPTION OF THE PREFERRED EMBODIMENT

Figure 1:
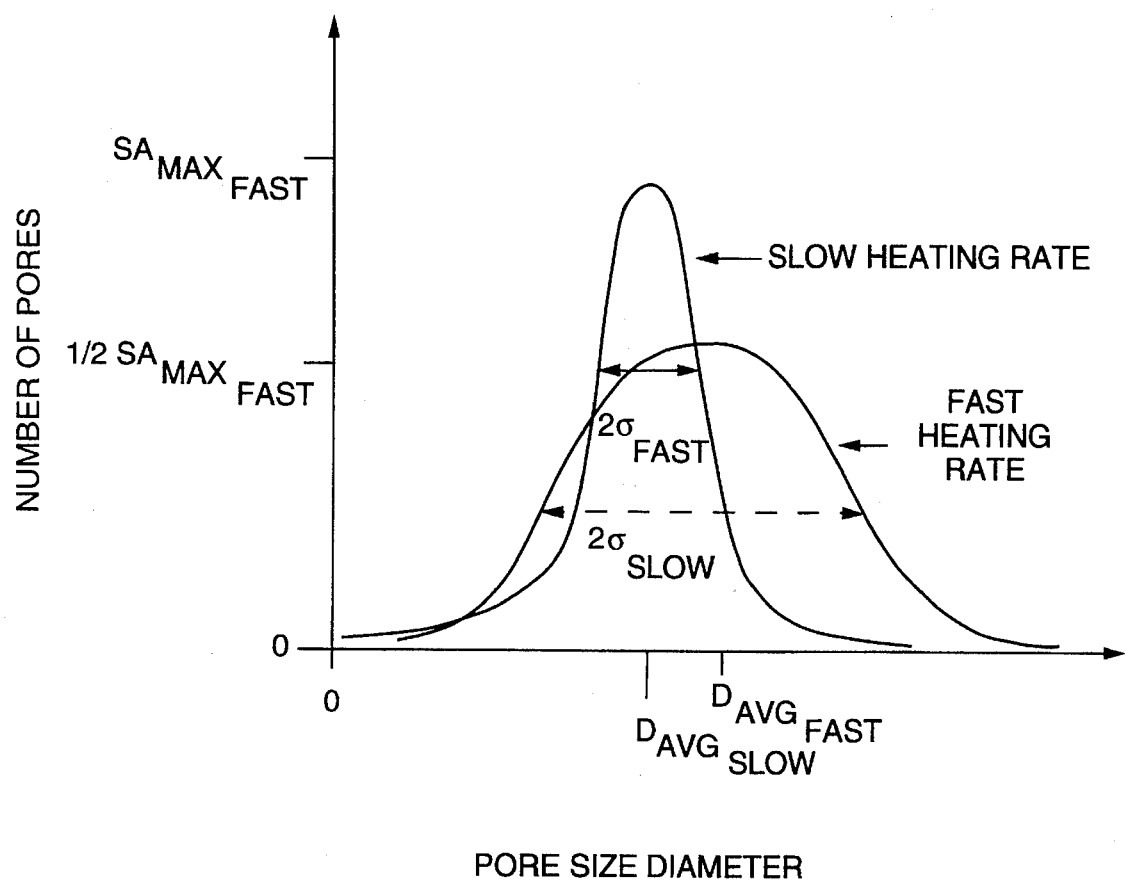
FIG. 1 depicts the pore size distribution for a high surface area material.
Figure 2:
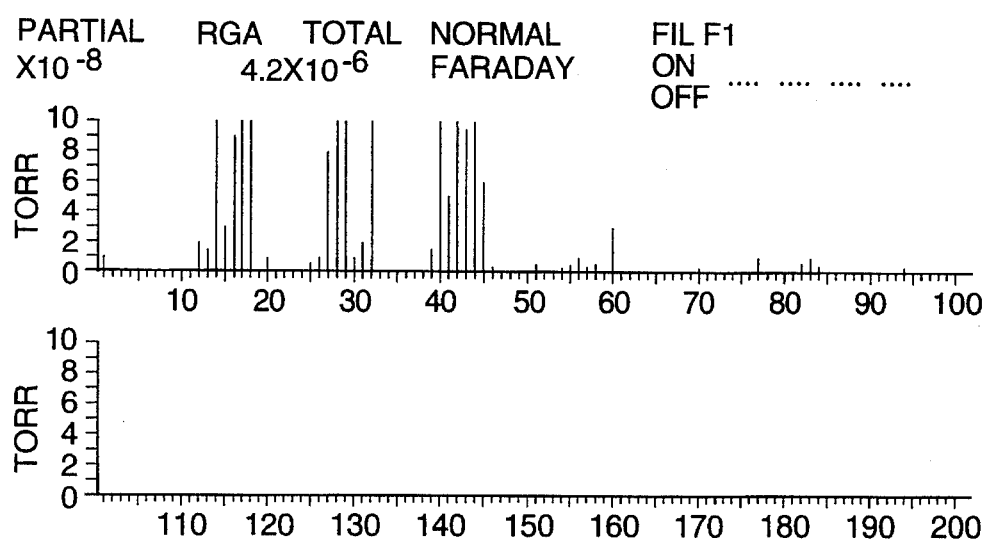
FIG. 2 shows mass spectrometer scans of desorbed vapor composition at room temperature.
Figure 3:
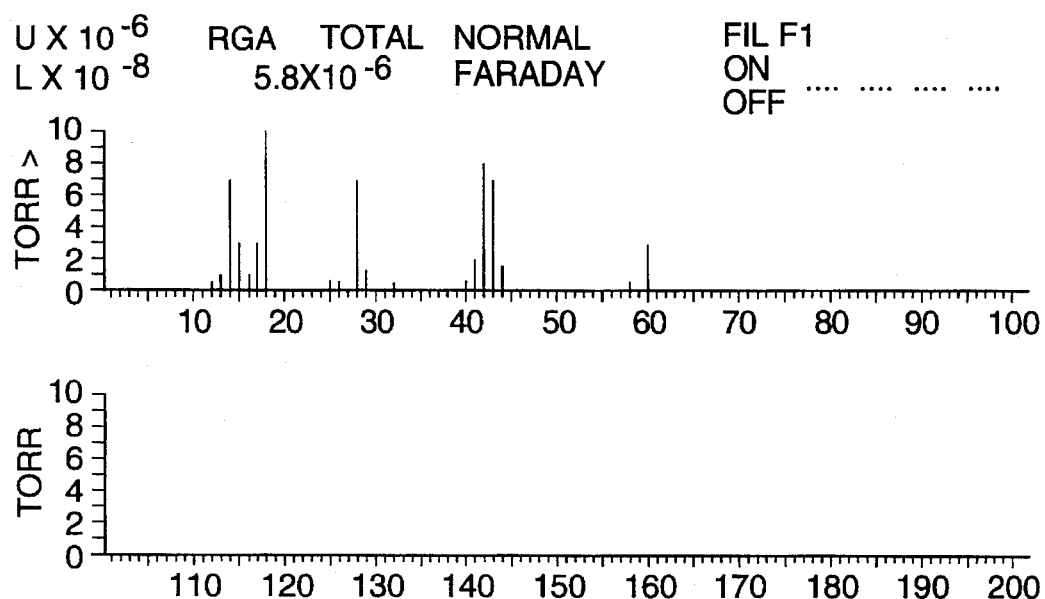
FIG. 3 shows mass spectrometer scans of desorbed vapor composition at 125° C.
Figure 4:
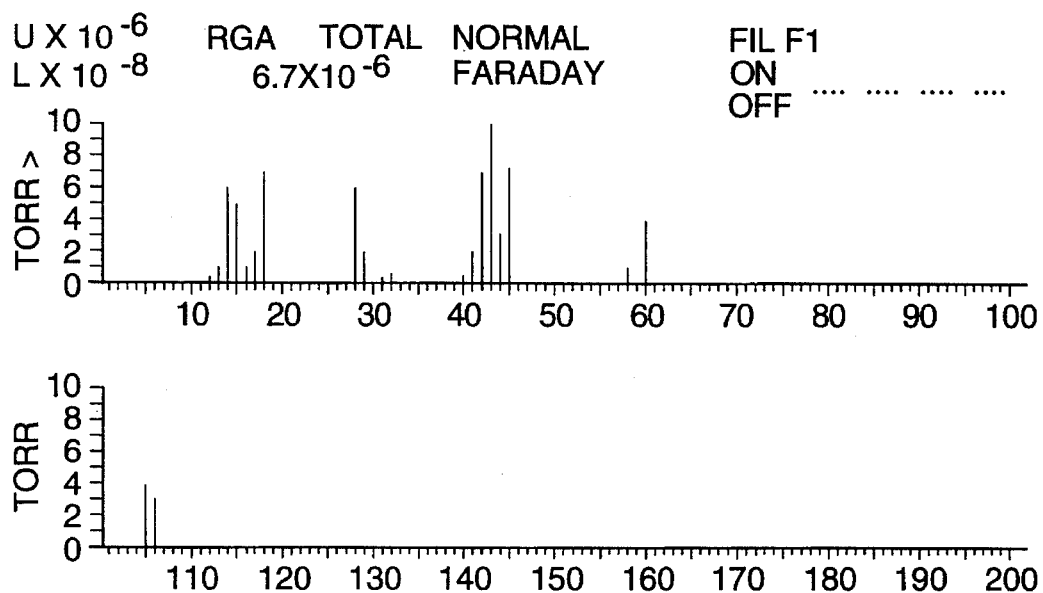
FIG. 4 shows mass spectrometer scans of desorbed vapor composition at 250° C.
Figure 5:
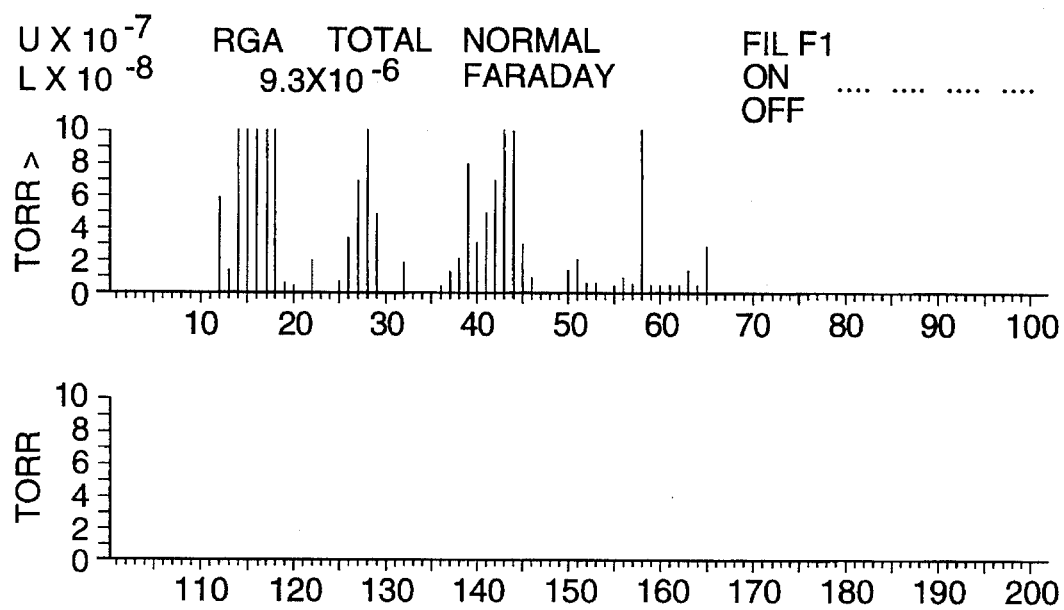
FIG. 5 shows mass spectrometer scans of desorbed vapor composition at 400° C.

A substantially hydrophobic, organophilic adsorbent which can effectively adsorb small organic molecules with a molecular size as small as 3.0 Å has been identified. The class of organics which can be effectively adsorbed using this adsorbent includes, for example, several straight chain hydrocarbons, benzene, simple derivatives of benzene and other organic molecules with a molecular size below 6 Å. The adsorbent of the present invention is superior to previous adsorbent materials in its ability to effectively adsorb organic molecules as small as 3.0 Å while not having its adsorptive properties diminished in high moisture environments.

The adsorbent is a composite of molecular sieving carbon and a hydrophobic silica with a pore size greater than 5 Å, such as SILICALITE™. The composite is formed by pyrolyzing a molecular sieving polymer precursor with a fine powder of hydrophobic silica. The hydrophobic silica preferably has an average particle size of less than 100 microns, most preferably less than 10 microns. Depending on the pyrolysis conditions and polymer precursor used, the molecular sieving component produced during pyrolysis comprises approximately 20% by weight of the precursor used.

The silicon to carbon mole ratio of the adsorbent should be between about 10:1 and 1:3, preferably between about 2:1 and 1:2, most preferably about 1:1. As it is best understood at the present time, the hydrophobic silica imparts hydrophobic properties to the adsorbent and provides pores with a size greater than 5 Å. At silicon to carbon mole ratios less than 1:3, it is believed that the concentration of silicon becomes too low to impart sufficient hydrophobic character to the composite. The molecular sieving component is believed to provide smaller pores (approximately 3-5 Å) which provides the composite with the capacity to remove small organic molecules. At silicon to carbon mole ratios greater than 10:1, it is believed that an insufficient concentration of small pores are present to impart the composite with significant small organic adsorption capacity.

The adsorbent can be prepared by pyrolyzing a homogeneous mixture of a hydrophobic silica and a molecular sieving polymer precursor. A homogeneous mixture is defined as a mixture where the silica and polymer precursor are substantially uniformly distributed within the mixture. The molecular sieving polymer precursor may be any polymer which yields a carbon molecular sieve upon pyrolysis. Examples of molecular sieving polymer precursors include, but are not limited to polyfurfuryl alcohol, polyacrylonitrile, polyvinylidene chloride, phenol-formaldehyde resin, polyvinylidene difluoride and mixtures thereof.

The adsorbent forming mixture is pyrolyzed between about 100 and 800° C., most preferably between about 100 and 600° C. Depending on the polymer, it has been found that a significant degree of pyrolysis does not occur at temperatures below 100° C. Meanwhile structural changes to the carbon molecular sieve occur at temperatures in excess of 800° C. The pyrolysis is preferably conducted under an inert atmosphere or vacuum, most preferably under an atmosphere of nitrogen, argon or helium gas.

The pore size diameter and size distribution of the adsorbent is mainly influenced by the selection and pyrolytic processing of the carbon molecular sieve precursor. The pore size diameter and size distribution is influenced to a lesser extent by the hydrophobic silica.

For high surface area material, the pore size distribution may be represented as shown in FIG. 1. The pore surface area will have a statistical distribution, with a peak having a maximum ($SA_{max}$) located at $d_{avg}$. The variance of the distribution is defined as the width, $2\sigma$, at one half the $SA_{max}$. Carbon molecular sieves possess a large surface area with a narrow pore size diameter variance. Its pore structure is determined by the evolution or release of decomposition products during a controlled pyrolysis. Zeolites, including SILICALITE™, have a controlled pore structure due to their atomic lattice structure. They also have a narrow pore size distribution. In general, for polyfurfuryl alcohol (PFA), phenol-formaldehyde resin, polyacrylonitrile (PAN), polyvinylidene chloride and polyvinylidene difluoride (PVDF), a controlled slow pyrolysis produces decomposition products which yield a narrow pore size distribution.

PFA has a five ring molecular structure, compared to the six ring molecular structure of the phenol-formaldehyde resin. The slightly smaller ring structure of PFA would be expected to produce a smaller pore size diameter during pyrolysis. Polyvinylidene chloride and polyvinylidene difluoride (PVDF) produce HCl and HF as their primary pyrolysis products, and yield a pore size structure corresponding to the average molecular diameters of these molecules. As such, they have the potential of producing a composite material with hydrophobic silica with a smaller average pore size diameter than PFA.

The size of the precursor fragments generated during pyrolysis also depends on the rate at which the pyrolysis temperature is raised. A faster heating rate is expected to increase the average pore size diameter and broaden the pore size surface area density, as shown in FIG. 1. By slowly ramping the pyrolysis temperature upward from 100° C., a greater number of small fragments are produced independent of larger fragments, thereby creating a greater concentration of small pores within the composite. By ramping the pyrolysis temperature up more rapidly, the smaller fragments are believed to exit concomitantly with larger fragments, thereby producing a distribution of predominantly large sized pores.

In general, pyrolysis to a higher temperature will also increase the average pore size diameter and broaden the pore size surface area density. In most cases, however, the broadening would be less than that which would be obtained by a faster heating rate.

In addition to being highly hydrophobic and having the desired size affinity, the adsorbent composites of the present invention have also been found to possess highly desirable structural properties such as a large crush strength and low particle cleavage rates. This is in sharp contrast to the low crush strength of molecular sieves and the relatively large particle shredding of zeolites.

The adsorbent composition of the invention may be used with gas phase samples and with aqueous samples and has broad based applications in purification and separation systems. One application of these materials is as a part of a closed loop life support system, where the composition may be used as part of a multiple stage separation to remove organic contamination during revitalization of water and breathing air.

The following examples set forth the preferred synthesis of the adsorbent composites of the invention as well as their physical properties. Further objectives and advantages of the invention will become apparent from the examples, which examples are not intended to limit the scope of the appended claims.

EXAMPLES

1. Adsorbent Preparation

An adsorbent according to the present invention was prepared by mixing crushed commercial SILICALITE™ (S-115, Linde) with polyfurfuryl alcohol (PFA) and pyrolyzing the resulting mixture under inert nitrogen.

Specifically, 5.0 g of SILICALITE™ was crushed in a crucible to a fine powder with an average particle size of less than 10 microns. The crushed SILICALITE™ was then added to 6.0 ml of PFA resin and mixed thoroughly with the resin. The mixture, now in the form of a paste, was put on a silica boat and transferred to a quartz tube heated by a furnace. High purity nitrogen was made to flow through the quartz tube at the rate of 150 cm³/min. The quartz tube was heated from the outside using a Lindberg temperature programmable furnace using the following heating cycle:

Room temperature to 100° C. in 30 min, maintain for 1 hr
100° C. to 200° C. in 30 min, maintain for 1 hr
200° C. to 300° C. in 30 min, maintain for 1 hr
300° C. to 400° C. in 30 min, maintain for 1 hr
400° C. to 500° C. in 30 min, maintain for 1 hr
500° C. to 600° C. in 30 min, maintain for 3 hrs.

At the end of the above heating cycle, the furnace was shut off and the quartz tube was allowed to cool to room temperature while maintaining continuous flow of high purity nitrogen through the quartz tube. The resulting composite of the carbon molecular sieve and SILICALITE™ was retrieved from the silica boat and stored in a well sealed glass bottle.

2. Adsorption of the Adsorbent

The adsorbent composite prepared in Example 1 was tested by exposing it to a mixture of phenyl acetic acid, $C_8H_8O_2$ (MW=136), and acetic acid, $C_2H_4O_2$ (MW=60), and subsequently analyzing the desorption products. Acetic acid has a characteristic size below 4.3 Å. Meanwhile, phenyl acetic acid has a characteristic size well in excess of 6.0 Å. Therefore, if the adsorbent were to possess the desired size selectivity, it would selectively remove acetic acid when exposed to the vapor of the two components.

The adsorbent was first exposed to phenyl acetic acid vapor at an absolute vapor pressure of about 10 mm Hg. In order to accomplish this, about 200 mg of the adsorbent was placed in a quartz cage fitted with a porous quartz frit. The cage was suspended in a glass flask containing about 100 mg of phenylacetic acid. The flask was then heated to a temperature of 170° C. and maintained at that temperature for 45 minutes. The flask was then cooled to room temperature, after which, the treated adsorbent was taken out. The adsorbent, still inside the quartz cage, was moved to another flask which contained about 350 mg of acetic acid. After quick evacuation, the flask was heated to 75° C. and maintained at that temperature for 1 hr. At the end of this period, the flask was cooled to room temperature. The treated adsorbent was taken out and stored in an air-tight glass bottle.

3. Desorption from the Treated Adsorbent

A direct determination of what had been captured by the adsorbent in Example 2 can be made by analyzing the desorption products upon heating the adsorbent. For an adsorbent of the type disclosed here, heating of the adsorbent to a temperature well above the boiling point of the captured species will remove the captured species by gradual desorption. Phenyl acetic acid has a boiling point of 265° C. while acetic acid has a boiling point of only 118° C. A detailed discussion regarding the analytical techniques used for determining adsorbent size selectivity is described in Hickey, et al., *Thermochimica Acta.* (1993) 226 333–342 and Sharma, et al., *Gas Separation and Purification* (1990) 4 203–207 which are incorporated herein by reference.

Thermal desorption from the treated adsorbent was studied by heating the adsorbent in a quartz flask connected to a mass spectrometer sampling system. About a 20 mg sample of the treated adsorbent was put in the quartz flask which was placed inside a heating mantle. The temperature of the sample was measured by means of a type K thermocouple inserted into the flask through a thermowell.

Before initiating heating, with the sample still at room temperature, the sampling valve connecting the quartz sample holder flask to the high vacuum chamber of the mass spectrometer sampling system was opened and the mass spectrometer background signal was allowed to stabilize for one hour. Gradual heating of the flask was initiated at a rate of approximately 4° C. per minute. The desorbed or outgassed vapor from the adsorbent passed directly into the detection chamber of the mass spectrometer. Periodic scans of the mass spectrometer output were obtained to monitor the composition of the desorbed vapor as a function of the adsorbent temperature.

Figure 6:
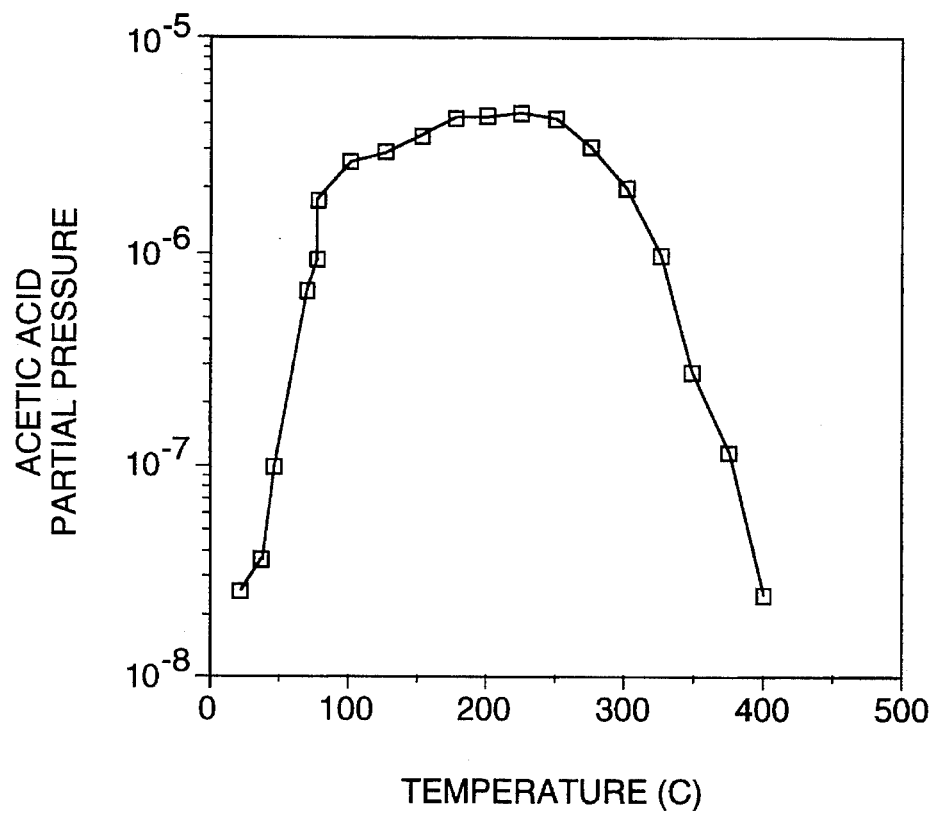
FIG. 6 shows an acetic acid signal intensity as a function of sample temperature.

FIGS. 2–5 show the mass spectrometer scans of the desorbed vapor composition at four different temperatures. FIG. 6 shows the acetic acid signal intensity as a function of sample temperature. Results indicate that acetic acid desorbs under the high vacuum conditions even at low temperatures. The desorption of acetic acid increases with temperature, reaching a maximum at about 225° C. At 400° C., the acetic acid signal peak completely disappears. However, the signal peak for phenyl acetic acid (MW=136) is completely absent throughout the heating period. This indicates that the adsorbent did not adsorb phenylacetic acid. This result is in agreement with the molecular size discrimination expected of this adsorbent.

The adsorption tests and the desorption measurements for the novel composite of molecular sieve and SILICALITE™ described here indicate that the composite has selective sorption properties for organic molecules of size less than 6 Å. This composition is also expected to be highly hydrophobic because both the carbon molecular sieve and SILICALITE™ are well known to be hydrophobic and organophilic.

4. Method for Determining Size Selectivity of Adsorbent Composition

One can routinely evaluate the adsorption and desorption characteristics of a particular adsorbent composition by monitoring the adsorption and desorption of molecules having different pore sizes following the protocol of examples 2 and 3. Exemplary molecules with known molecular sizes include:

| compound | molecular size (Å) |
| --- | --- |
| carbon dioxide | 3.3 Å |
| acetylene | 3.8 Å |
| normal butane | 4.3 Å |
| acetic acid | 4.3 Å |
| iso-butane | 5.0 Å |
| dimethyl ether | 5.0 Å |
| cyclohexane | 5.8 Å |
| benzene | 6.0 Å |
| phenylacetic acid | >6.0 Å |

Thus, by monitoring which of the above molecules are adsorbed and the uptake capacity of the adsorbent, one can determine the size selectivity range of a given composition.

5. Crush Strength of Adsorbent Compositions

An examination of the physical appearance and crush strength of the adsorbent composition prepared in Example 1 indicates that it is structurally stronger and significantly more resistant to fines generation than carbon molecular sieves and SILICALITE™ alone. This property makes this material a promising candidate for removal of lighter organic contaminants (of size below 6 Å) for space based instruments. By contrast, pure carbon molecular sieves are very weak structurally. SILICALITE™ generates a lot of fines which are undesirable for most practical applications.

While the present invention is disclosed by reference to the preferred embodiments and examples detailed above, it is to be understood that these examples are intended in an illustrative rather than limiting sense, as it is contemplated that modifications will readily occur to those skilled in the art, which modifications will be within the spirit of the invention and the scope of the appended claims.

What is claimed is:

1. An adsorbent formed by the pyrolysis of hydrophobic silica and a molecular sieve polymer precursor wherein the silica preferentially adsorbs molecules having a molecular size of about 5–6 Å, the adsorbent preferentially adsorbing molecules having a molecular size of about 3–6 Å.

2. An adsorbent of claim 1 wherein the molecular sieve polymer precursor is selected from the group consisting of polyfurfuryl alcohol, polyacrylonitrile, polyvinylidene chloride, phenol-formaldehyde resin, polyvinylidene difluoride and mixtures thereof.

3. An adsorbent of claim 2 wherein the polymer is polyfurfuryl alcohol.

4. An adsorbent of claim 1 wherein the silicon to carbon mole ratio of the adsorbent is between about 2:1 and 1:2.

5. An adsorbent of claim 4 wherein the silicon to carbon mole ratio is about 1:1.

6. An adsorbent of claim 1 wherein the adsorbent is hydrophobic.

7. An adsorbent of claim 1 wherein the hydrophobic silica has an average particle size of less than 100 microns.

8. An adsorbent of claim 7 wherein the hydrophobic silica has an average particle size of less than 10 microns.

9. A method of making an adsorbent for small organic molecules having a molecular size of between about 3 and 6 Å comprising the steps of:
 a) mixing hydrophobic silica and a molecular sieve polymer precursor to form a homogeneous mixture, the hydrophobic silica preferentially adsorbing molecules having a molecular size of about 5–6 Å; and
 b) pyrolyzing the homogeneous mixture thereby depositing carbon on the hydrophobic silica and forming the adsorbent, the adsorbent preferentially adsorbing molecules having a molecular size in a range of 3–6 Å.

10. A method according to claim 9 wherein the molecular sieve polymer precursor is selected from the group consisting of polyfurfuryl alcohol, polyacrylonitrile, polyvinylidene chloride, phenol-formaldehyde resin, polyvinylidene difluoride and mixtures thereof.

11. A method according to claim 10 wherein the polymer is polyfurfuryl alcohol.

12. A method according to claim 9 wherein the silicon to carbon mole ratio of the adsorbent is between about 2:1 and 1:2.

13. A method according to claim 12 wherein the silicon to carbon mole ratio is about 1:1.

14. A method according to claim 9 wherein the hydrophobic silica has an average particle size of less than 100 microns.

15. An adsorbent of claim 14 wherein the hydrophobic silica has an average particle size of less than 10 microns.

16. A method according to claim 9 wherein the adsorbent is hydrophobic.

17. A method according to claim 9 wherein the pyrolysis is performed between about 100° and 800° C.

18. A method according to claim 17 wherein the pyrolysis is performed between about 100° and 600° C.

19. A method according to claim 18 wherein the pyrolysis temperature is ramped from at least 100° C. to about 600° C.

20. A method of selectively adsorbing small organic molecules having a molecular size of between about 3 and 6 Å comprising the steps of:
 providing an adsorbent formed by pyrolysis of hydrophobic silica and a molecular sieve polymer precursor, the silica preferentially adsorbing molecules having a molecular size of about 5–6 Å, the adsorbent preferentially adsorbing molecules having a molecular size of about 3–6 Å; and
 contacting a sample containing small organic molecules with the adsorbent.

21. A method according to claim 20 wherein the molecular sieve polymer precursor is selected from the group consisting of polyfurfuryl alcohol, polyacrylonitrile, polyvinylidene chloride, phenol-formaldehyde resin, polyvinylidene difluoride and mixtures thereof.

22. A method according to claim 20 wherein the polymer is polyfurfuryl alcohol.

23. A method according to claim 20 wherein the silicon to carbon mole ratio of the adsorbent is between about 2:1 and 1:2.

24. A method according to claim 20 wherein the hydrophobic silica has an average particle size of less than 100 microns.

25. A method according to claim 20 wherein the sample is either a gaseous or an aqueous sample.

26. A method of forming an adsorbent, comprising the steps of:
 combining a hydrophobic silica and a molecular sieve polymer precursor to form a homogenous mixture, the hydrophobic silica having an average particle size of less than 100 microns; and
 pyrolyzing the mixture and breaking down the molecular sieve polymer precursor so that carbon is deposited on the hydrophobic silica.

27. A method of forming an adsorbent of claim 26, wherein:
 the providing step is carried out with the hydrophobic silica having an average particle size of less than 10 microns.

28. A method of forming an adsorbent of claim 26, wherein:
 the combining step is carried out with the silica preferentially adsorbing molecules having a molecular size in a range of 5–6 Å.

\* \* \* \* \*